United States Patent [19]
Johnson

[11] 3,794,027
[45] Feb. 26, 1974

[54] ANIMAL ANESTHESIA MACHINE

[75] Inventor: Donald W. Johnson, Wooster, Ohio

[73] Assignee: Snyder Manufacturing Company, Inc., New Philadelphia, Ohio

[22] Filed: June 29, 1970

[21] Appl. No.: 50,850

Related U.S. Application Data
[63] Continuation of Ser. No. 685,755, Nov. 27, 1967, abandoned.

[52] U.S. Cl. .............................................. 128/188
[51] Int. Cl. .......................................... A61m 17/00
[58] Field of Search .................. 128/188, 191, 172.1

[56] References Cited
UNITED STATES PATENTS

| | | | |
|---|---|---|---|
| 2,407,221 | 9/1946 | Bloomheart | 128/188 |
| 2,837,413 | 6/1958 | Hay | 128/191 R X |
| 2,868,198 | 1/1959 | Brooke | 128/188 |
| 2,870,764 | 1/1959 | Carlson et al. | 128/188 |
| 3,088,810 | 5/1963 | Hay | 128/191 R X |
| 3,172,405 | 3/1965 | Sugg | 128/188 |
| 3,192,924 | 7/1965 | Edmondson et al. | 128/188 |
| 3,240,567 | 3/1966 | Caparreli et al. | 23/284 |

FOREIGN PATENTS OR APPLICATIONS

| | | | |
|---|---|---|---|
| 1,375,946 | 1964 | France | 128/172.1 |
| 519,203 | 1940 | Great Britain | 128/188 |
| 630,481 | 1949 | Great Britain | 128/188 |
| 144,260 | 1957 | U.S.S.R. | |

Primary Examiner—Richard C. Pinkham
Assistant Examiner—Paul E. Shapiro
Attorney, Agent, or Firm—Olson, Trexler, Wolters and Bushnell

[57] ABSTRACT

A central molded canister contains a centrally positioned charge of carbon dioxide absorbent. Located beneath the absorbent is a chamber having an outlet and two inlets and a further passageway connected to a rebreathing bag. A source of oxygen connects through a valve assembly to each of the inlets by two separate lines. One of these lines contains a first vaporizer. Leading from the outlet is a line which connects with a breathing tube and then returns to an inlet in the cannister above the carbon dioxide absorbent. A second vaporizer is connected to this line between the chamber outlet and the breathing tube. The second vaporizer comprises an inlet and an outlet communicating with a chamber. Two apertures are also located in the chamber. A jar is attached to the chamber and contains anesthetic liquid. A wick divides the jar into two sections, each communicating with one of the apertures. A vane is pivotally mounted in the chamber and is pivotal between a first position wherein the inlet and outlet communicate directly through the chamber, and a second position wherein the inlet communicates with one of the apertures, through the first section of the jar, through the wick, through the other aperture and then to the outlet.

2 Claims, 5 Drawing Figures

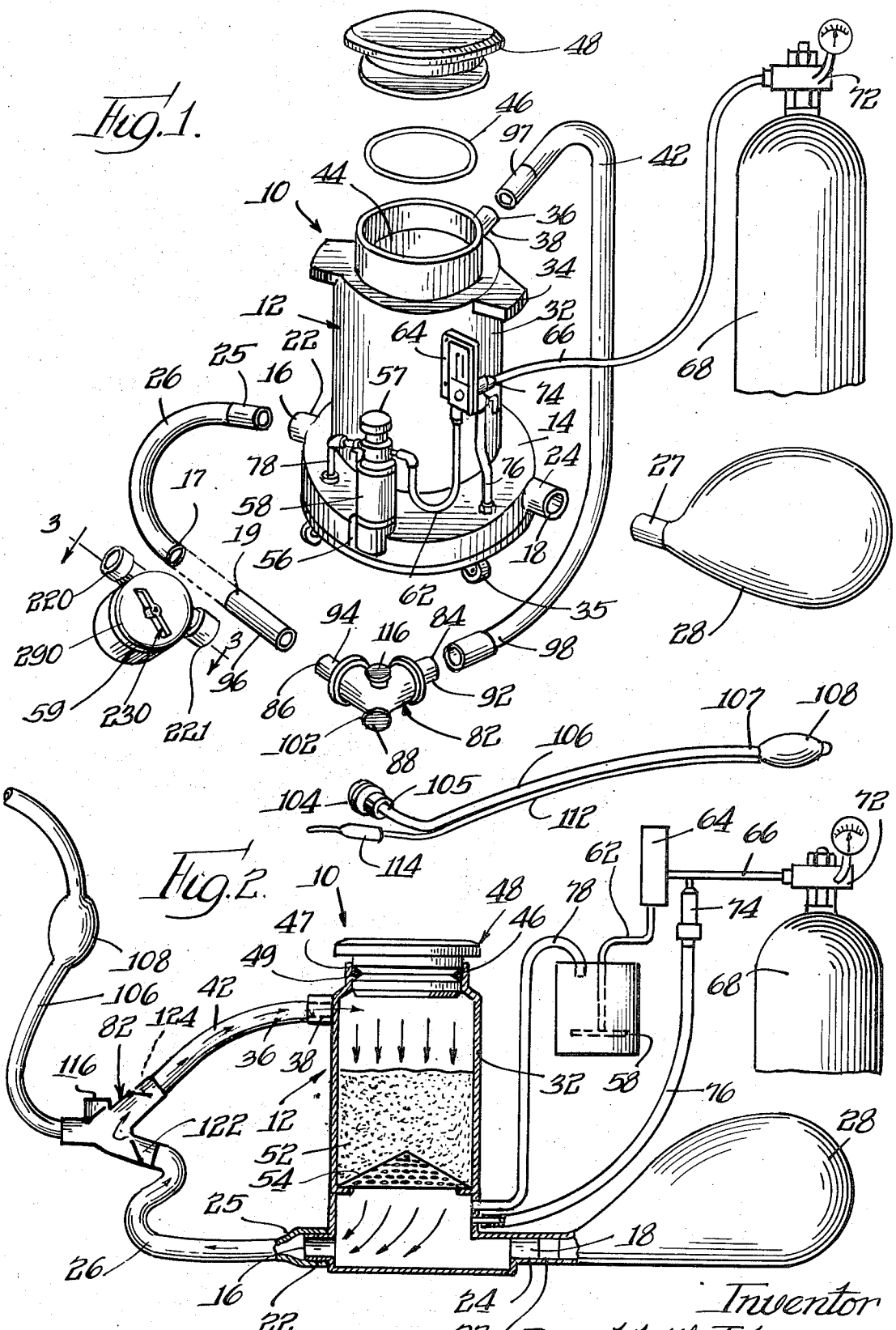

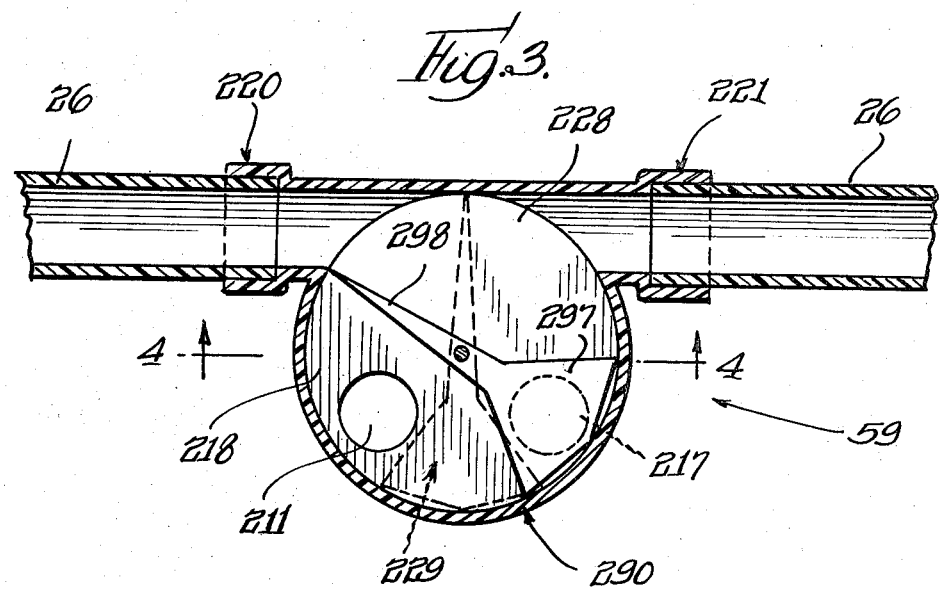
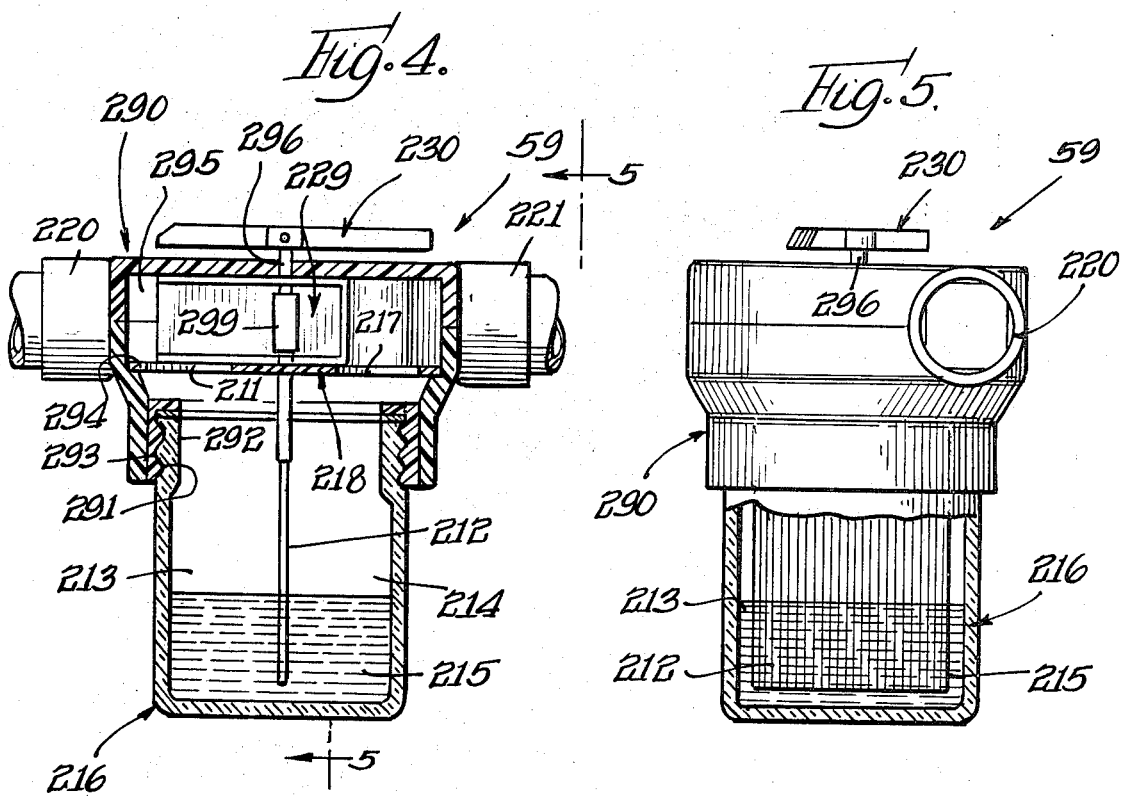

ANIMAL ANESTHESIA MACHINE

REFERENCE TO RELATED APPLICATION:

This application is a continuation of U.S. application Ser. No. 685,755, filed Nov. 27, 1967 now abandoned and entitled "Animal Anesthesia Machine".

It is a general object of this invention to provide new and improved apparatus for administering anesthesia to animals.

It is a more specific object of this invention to provide an anesthesia machine especially suited for large animals, which is light weight, compact and easily transported.

It is a further object to provide an anesthesia machine of the above-described type which can be easily assembled and disassembled for purposes of cleaning, drying and transporting.

It is still another object of this invention to provide an anesthesia machine which is of the closed circuit type and which, due to a one-piece canister portion, is leakproof and is therefore also usable for manual artificial respiration, and is virtually indestructible.

Other objects and advantages of the present invention will become apparent from the following description and the accompanying drawings wherein:

FIG. 1 is an exploded perspective view of an anesthesia machine according to the invention;

FIG. 2 is a schematic representation of the circuit of the machine of FIG. 1;

FIG. 3 is a cross-sectional view of the in-the-circuit vaporizer unit shown in FIG. 1, taken along the line 3—3 thereof;

FIG. 4 is a cross-sectional view of the in-the-circuit vaporizing unit of FIG. 3, taken along the line 4—4 thereof; and FIG. 5 is a cross-sectional view of the in-the-circuit vaporizing unit of FIG. 4 taken along the line 5—5 thereof.

Referring now to the drawings in more detail, FIG. 1 shows a preferred embodiment 10 of an animal anesthesia machine according to the invention. The machine includes a canister or housing 12, shown here having a shape similar to that of a large milk can, which is preferably of one-piece translucent plastic molded construction. The milk can shape of the canister with its wide base portion 14, serves to stabilize the canister so that it will be prevented from being upset during the anesthetizing process. The base portion 14 defines a mixing chamber and includes on opposite sides thereof a pair of apertures or openings 16 and 18, each of which are surrounded by a respective protruding neck portion 22 and 24 for receiving in a slidable, force fitting, slip-together fashion, one end 25 of a hose 26 and the connector portion 27 of a reservoir bag 28, respectively. The main body portion 32 of the canister 12 is cylindrically shaped and has integrally molded therewith near the top thereof a pair of handle portions 34 which, along with casters 35 attached to base 14, provide a means by which the canister 12 may be easily transported. Near the top of the cylindrically shaped main body portion 32 is a third aperture 36, also having a protruding neck portion 38 integrally molded therewith, and provided to receive one end 97 of a hose 42, also in an overlapping slip-together, relationship therewith. Directly in the top of body portion 32 is a large opening 44 through which carbon dioxide absorbing material 52, such as soda lime crystals or the like, may be placed into the canister. This material can best be seen in FIG. 2 of the drawings. A resilient O-ring 46, preferably of rubber or the like material, is provided to seal aperture 44 upon the fitting of lid 48 onto the latter. The relation of O-ring 46 and lid 48 to the main body 32 of canister 12 is best shown in FIG. 2 of the drawings where it can be seen that O-ring 46 is placed around lid 48 at indented portion 47 thereof. As the lid is placed onto the canister, the radially extending O-ring is force fitted into the opening 44 so as to grip, radially outwardly, against the inner walls 49 of aperture 44. To prevent the soda lime 52 from falling into the base portion 14 there is provided a conical shaped, stainless steel screen 54 extending upwardly into the material, and having openings therein which are small enough to contain the absorbent material and yet allow the circulation of gases therethrough.

An indentation 56 has been integrally molded into base portion 14 of canister 12 to receive a vaporizer unit 58 containing the anesthetic, in this case, halothane, used in the anesthetizing process. As can be seen, the vaporizer 58 is connected by means of a tube 62 to a flow meter 64 which in turn is connected by a tube 66 to an oxygen tank or supply source 68. The flow of oxygen from the source 68 is controlled in a well known manner by an oxygen regulator 72 located at the outlet of oxygen source 68. A flood valve 74 is provided near the inlet to flow meter 64 so that oxygen from source 68 may be channeled either through flow meter 64, into the vaporizing unit 58, or through a tube 76 directly into the bottom or base portion 14 which provides a mixing chamber or area for canister 12, and in turn to reservoir bag 28 which is shown supported at ground level adjacent the canister 12. The manipulation of the oxygen flow valve 74 will be explained below in greater detail. The outlet of vaporizer 58 is connected through a tube 78 which transfers anesthetic gas into base portion 14 of canister 12.

The anesthesia machine according to the invention may also be used with an in-the-circuit vaporizing unit 59, shown adjacent hose 26 in FIG. 1 of the drawings, if a methoxyfluorane anesthetic is desired to be used, the unit 59, which will be described in greater detail below, includes a pair of coupling members 220 and 221 which, when using the unit 59, are connected to respective sections 17 and 19 of hose 26. Vaporizer units 58 and 59 are for separate use; thus, if when unit 59 is used, the oxygen flow from valve 74 will be diverted from vaporizer unit 58 so as to remove the last-mentioned vaporizer from the circuit, and when vaporizer unit 58 is used, unit 59 will not be connected to hose 26.

A Y-shaped bi-directional valve assembly 82 including three apertures 84, 86 and 88, respectively, two of which, 84 and 86, have protruding neck portions 92 and 94, respectively, similar to those on canister 12 described above, has been provided to receive in slip-together relationship at the aforementioned neck portions thereof, the ends 96 and 98 of hoses 26 and 42, respectively. The third opening or aperture 88 in valve assembly 82 has fitted thereto a slip-on coupling 102 for attachment thereof to an endotracheal tube adapter 104 connected to an end 105 of an endotracheal tube 106. The endotracheal tube, as is known in the art, is provided to be received by the animal undergoing the anesthetic process. An inflatable endotracheal tube cuff 108 is provided at the other end 107 of the endotracheal tube 106 for placement into the trachea of the animal so that the tube 106 will not become dislodge therefrom during the administering of anesthesia. Connected to endotracheal tube 106 is a second tube 112 which has attached thereto an endotracheal indicator balloon 114 used to detect the receipt of anesthesia by the animal being anesthetized. Valve assembly 82 also includes at the upper end thereof and exhaust valve 116 which serves to eliminate a portion of the carbon dioxide being exhaled through the tube 106 by the animal undergoing anesthesia.

Referring now to FIGS. 3 through 5 of the drawings, wherein there is illustrated the in-the-circuit vaporizer unit 59, mentioned above. The vaporizer unit comprises a cylindrically shaped jar 216 partially filled with liquid anesthetic 215 of the methoxyfluorane type. The jar 216 is attached to the circular head portion 290 of the unit; in this case the jar 216 includes threads 291 at the neck 292 thereof which mate with threads 293 of head portion 290. A force fitted interconnection or other means may also be used to hold jar 216 to the head portion 290 if desired. A wick 212 extending downwardly into the anesthetic liquid 215 is attached to a circular plate 218 located in head portion 290 and resting on shoulder portion 294 thereof. The wick divides the jar 216 into sections 213 and 214. The plate 218 has located therein a pair of apertures 211 and 217, one of which communicates with section 213 of jar 216 and one of which communicates with section 214, respectively. A vane 229 is rotatably mounted on a spindle 299 in compartment 295 above plate 218 in head portion 290. Extending outwardly from compartment 295 is the free end 296 of spindle 299 which has connected thereto an indicator bar 230 provided for manually setting the vane 229 to provide either anesthesia or pure oxygen to the animal being anesthetized. The vane, as will be noted, is narrow on one end, 298 thereof and broad and triangularly shaped at the other end 297 thereof. As mentioned above, a pair of coupling members 220 and 221 are provided on either end of the compartment 295 and are joined by channel 228 which is an integral part of compartment 295. The coupling members are used to interconnect the vaporizing unit 59 with hose 26 into the circuit of the anesthesia apparatus.

As can be seen in FIG. 3 of the drawings, through the manipulation of indicator bar 230, vane 229 can be moved to the position as shown in solid lines wherein the aperture 217 is sealed or covered by the wide, triangularly shaped end 297 of the vane and wherein the narrow, needle-like end 298 blocks entry into aperture 211, so that only oxygen coming from the left section of hose 26, as shown in FIG. 3, passes directly through channel 228. The vane 229 is also positionable as shown in dotted lines wherein the narrow end 298 of the vane blocks channel 228 but opens both apertures 211 and 217. In this position anesthetic gas is channeled to the animal undergoing anesthesia.

For purposes of affording a more complete understanding of the invention, it is advantageous now to describe in greater detail the use of the above-described anesthesia machine in the anesthetizing process.

To begin with, canister 12, being held by integrally molded handles 34 may be rolled on casters 35 to the location where it is to be used. Because of the light weight of the canister, due to its molded plastic construction, it is also easily carried when it is not practical to be rolled from place to place and is virtually indestructible if dropped or bumped in the moving process. Once situated, lid 48 is removed from the canister and the soda lime material 52 within the canister is checked to see that it still is in an active state. This will be apparent from the top one or two inches of the soda lime crystals which, if darkened, require replacement or reactivation. Because the canister is molded of a translucent plastic material, detection of the darkened soda lime during the process is possible without need for removal of lid 48. After the crystals have been checked the remaining components of the machine, which can be transported in a compact package along with the canister, are assembled thereto. Ends 25 and 97 of hoses 26 and 42, respectively, are slipped over neck portions 22 and 38, respectively, and the connector 27 of reservoir bag 28 is fitted over neck portion 24 of aperture 18 in base 14 of the canister. The opposite ends 96 and 98 of hoses 26 and 42, respectively, are then connected to neck portions 94 and 92, respectively, of Y-valve assembly 82 in a like manner. The Y-valve assembly is in turn connected at aperture 88 to the endotracheal tube 106 by means of fittings 102 and 104, respectively. After the connections have been made, oxygen supply 68 is attached to flow valve 64 by means of hose 66. At this point, the exhaust valve 116 of Y-valve assembly 82 is closed and the oxygen tank or source 68 is opened to fill the reservoir bag 28. Leaks are checked for by firmly pressing on the bag as it is being filled, after which vaporizer jar 58, which has already been placed into position in indentation 56 provided in the base portion of the canister, is filled with a suitable anesthetic, such as liquid halothane. To fill jar 58, lid 57 thereof is removed and the liquid anesthetic is poured thereinto. After filling the vaporizer jar, exhaust valve 116 of Y-valve assembly 82 is opened an is kept open during the remainder of the process. This is important for good denitrogenation and prevention of hypoxia; i.e., reduction of oxygen tension and/or decrease in oxygen volume percentage, for as the animal exhales, a portion of the carbon dioxide and excess nitrogen being expelled by the lungs is eliminated through valve 116, thus preventing too great an amount of nitrogen from being recirculated to and accumulated in the blood stream of the animal.

Once the animal has been restrained, in preparation for receipt of the anesthetic gas, a dental wedge is inserted between the upper and lower cheek teeth of the animal. The animal's tongue is withdrawn and the cuffed end 108 of the endotracheal tube 106 is inserted into the pharynx thereof. As the animal inspires, the tube 106 is pushed gently into the trachea and the cuff portion 108 inflated to insure the implantation of the tube therein. At this time, the valve 74 should be positioned to bubble oxygen from source 68 through the liquid anesthetic in vaporizer 58 (see FIG. 2). The vaporized anesthetic then passes through tube 78 into base portion 14 filling the latter. As the animal inhales a mixture of oxygen and anesthetic gas from within base 14, and additional oxygen from reservoir bag 28, is drawn through hose 26 and one-way valve 122 in bi-directional Y-valve assembly 82, and in turn through endotracheal tube 106 into the lungs of the animal (not shown). No anesthetic gas mixture can enter hose 42 through valve 124 in Y-valve assembly 82, for the force created by the inhalation of the animal acts to close valve 124 thereof.

Upon exhaling, the carbon dioxide and other waste gases expelled from the lungs of the animal pass in a reverse direction through endotracheal tube 106 into Y-valve assembly 82. At this point a portion of the gases are eliminated from the otherwise closed system through exhaust valve 116 which remains open throughout the process. The remainder of the waste gases pass, through one-way valve 124, into the aperture 36 in the upper portion of canister 12. None of the gases can enter valve 122 for, due to the exhalation, the valve is forced to a closed position. During exhalation, a portion of the waste gases are forced through the soda lime material 52, which, as explained above, substantially eliminates the carbon dioxide therefrom. The remaining, substantially carbon dioxide free gas is brought into the base portion 14 of canister 12 where it is mixed with an additional volume of the anesthetic-oxygen mixture, for recirculation into the lungs of the animal. Upon subsequent inhalation by the animal, more of the waste gases are drawn through the carbon dioxide absorbing material into the base portion of canister 12 where the process begins once again. As the animal continues to breathe, the reservoir bag 28, which initially was filled with oxygen, begins to accumulate an anesthetic mixture. As will be explained below, periodically during the process the bag should be removed, emptied and refilled with oxygen.

While the system is a closed one and leak-proof due to the one-piece molded construction of canister 12 and the gas-tight slip-on connections of the hoses, and the like, a portion of the gas is nevertheless depleted. This is due partially to the use of the exhaust valve 116 as well as the use by the animal of a portion of the oxygen-anesthetic content; thus oxygen must be added to the system regularly. For the safest results it is best to slowly induce anesthesia during a five to ten minute period. This is accomplished by adjusting the oxygen flow rate during the time the anesthetic is being induced into the animal; for example, for an animal such as a horse, the flow rate should be set at approximately four litres per minute or more. The vaporizer which in essence can be turned on and off by means of valve 74 should, for the safest use of the anesthetic, be turned on fully for fifteen to thirty seconds every minute or so until the animal reaches light surgical anesthesia. It has been found that intermittent vaporization of halothane, or the like, is safer than continuous vaporization, since it is less likely that the animal will drift into a very deep place in anesthesia. The signs of light surgical anesthesia are a weak blinking of the eyelid, deep, even respiration occurring at a rate of five to twelve per minute, a steady flow pulse and mucous membranes red in color.

In order to assure denitrogenation and the prevention of hypoxia, it is advisable to empty the reservoir bag which as mentioned above now contains an anesthetic mixture, and refill it by using the flood valve 74 only with oxygen. If during the anesthetic process respiration becomes shallow or jerky, the reservoir bag should likewise be removed, emptied, and refitted to neck portion 24 of aperture 18 in the base portion 14, and be refilled with oxygen. In case the animal goes into a state of hypoxia, and respiration slows or stops, the reservoir bag, which is external to the canister 12 and therefore readily available, may be manually compressed to provide a forced breathing of oxygen for the animal. This technique is known in the art as "bagging".

The anesthetic should be kept as light as possible near the end of the anesthetizing period, especially immediately before the time arrives to bring the animal out of the anesthetic stupor. During this time, anesthetic gas and carbon dioxide should be washed out of the system as often as possible. This can be accomplished by emptying the reservoir bag and refilling with oxygen four or five times at two or three minute intervals. The endotracheal tube 106 should be removed as soon as the animal begins to move about, coughs or swallows, after which the animal should be taken to a recovery room.

The above description was given with the asssumption that a halothane, or the like, vaporizer unit, such as 58, would be used with the machine in the anesthetizing process. However, as also mentioned above, the machine according to the invention is adaptable to be used with the in-the-circuit vaporizer 59 when the utilization of low volatile methoxyfluorane is required for faster induction and more controllable administration of the anesthetic. In this case, the vaporizer jar 58 would be bypassed by correctly positioning valve 74, so the oxygen will be directed into base 14 of canister 12, and an in-the-circuit vaporizer unit 59 would be interconnected with hose 26 of the machine as shown in FIG. 1.

When unit 59 is used as the anesthetic source, oxygen from base 14 is passed therefrom via hose 26 through inlet coupling 220 and into aperture 211 thereof; the vane 229 being positioned as shown in dotted lines in FIG. 3. The oxygen passes into section 213 of jar 216 and through wick 212 which is saturated with the liquid methoxyfluorane in jar 216. As the oxygen passes from section 213 of the jar through the wick and into section 214 thereof, a vapor of anesthetic gas is provided. The gas then passes out through opening 217 in plate 218, through outlet coupling 221, into hose 26 and on to the lungs of the animal.

The administering of the methoxyfluorane is much the same as in the case of halothane; however, the methoxylfuorane produces a faster response from the animal, and one which is more controllable. As the animal breathes the anesthetic vapor into his lungs and exhales the waste gases, vapor will begin to accumulate in the reservoir bag 28 of the system and, the animal may, as in the case of halothane, begin to receive too great an amount of anesthetic. If this occurs, the indicator bar 230 of vaporizer unit 59 may be turned so that vane 229 is positioned as shown in solid lines in FIG. 3, so as to bypass openings 211 and 217, and pass pure oxygen through channel 228 into outlet coupling 221 and on to the animal through hose 26.

If it becomes necessary to "bag" the animal, this can also be accomplished by moving the vane 229 into the last mentioned position, and proceeding with the "bagging" process as described above.

Thus, through the use of the anesthesia machine as described above, safe, efficient anesthetizing of animals, large ones in particular, may be accomplished, and further, because of the novel, easy to assemble construction of the machine, it is reliable, leak-proof and convenient to handle.

It will be obvious to those skilled in the art that changes and modifications may be made without departing from this invention in its broadest aspects, and

I claim:

1. Animal anesthetizing apparatus comprising: canister means including an inlet port and an outlet port, means within said canister for receiving carbon dioxide absorbing material positioned intermediate said ports such that the exhaled waste gases from the animal will pass through said material to purge said gases of carbon dioxide and a mixing chamber where said waste gases are mixed with oxygen; bi-directional valve means associated with said ports such that the gases being inhaled and exhaled by the animal can pass through said canister in only one direction, thus defining a closed system having an inhalation portion and an exhalation portion within said canister; oxygen supply means communicating with said mixing chamber for introducing oxygen into said canister; vaporizer means for providing anesthetic to said system, said vaporizer means including first and second vaporizer units, said first unit being operably connected with said oxygen supply means intermediate said supply means and said mixing chamber, said second unit being operably associated with the inhalation portion of said system and comprising a jar member adapted to contain therein a quantity of liquid anesthetic, a wick positioned in said jar dividing it into two sections, a plate to which said wick is attached, said plate having a pair of apertures therein, each of said apertures communicating with a respective section of said jar and with a compartment separated from said jar by said plate and having inlet and outlet means provided in operable connection with said system and control means for said apparatus including valve means associated with said oxygen supply means and providing an alternate path of communication with said canister whereby the oxygen being supplied will bypass said first unit and enter directly into said mixing chamber where it will be mixed with the waste gases, and additional control means for selectively connecting and disconnecting said second unit to the system, said additional control means including a vane movably mounted within said compartment between said inlet and outlet means, said vane being positionable from a first position in blocking relation to said apertures so that gases may flow directly from said inlet means to said outlet means through said compartment, into a second position where said vane blocks the direct communication between said inlet and outlet means, whereby gases entering said compartment through said inlet means will be channeled into said jar prior to their passage out of said compartment by way of said outlet means whereby when operably connected thereto purged waste gases and anesthetic free oxygen combined in said mixing chamber can then be introduced into said second unit prior to inhalation by the animal; and reservoir means attached to said canister in connection with said chamber.

2. Animal anesthetizing apparatus, said apparatus comprising: canister means including an inlet port and an outlet port, and means within said canister for receiving carbon dioxide absorbing material so that said material will be positioned intermediate said ports such that the exhaled waste gases from the animal will pass through said material to purge said gases of carbon dioxide and a chamber defined by said canister wherein exhaled waste gases are mixed with oxygen; bi-directional valve means associated with said ports such that the gases being inhaled and exhaled by the animal can pass through said canister in only one direction, thus defining a closed system having an inhalation portion and an exhalation portion communication therebetween being established through said canister; oxygen supply means communicating with said chamber for introducing oxygen into said canister; vaporizing means for adding anesthetic to said closed system, said vaporizing means including a jar member adapted to contain therein a quantity of liquid anesthetic, a wick positioned in said jar dividing it into two sections, a plate to which said wick is attached, said plate having a pair of apertures therein, each of said apertures communicating with a respective section of said jar and with a compartment separated from said jar by said plate and having inlet and outlet means provided in operable connection with said system, and a vane movably mounted within said compartment between said inlet and outlet means, said vane being positionable from a first position in blocking relation to said apertures so that gases may flow directly from said inlet means to said outlet means through said compartment, into a second position where said vane blocks the direct communication between said inlet and outlet means, whereby gases entering said compartment through said inlet means will be channeled into said jar prior to their passage out of said compartment by way of said outlet means. and control means for said apparatus including, valve means associated with said oxygen supply means and connecting same to said canister such that the oxygen being introduced into said system may be directed along one or the other of two alternate paths, one said path passing said oxygen through the vaporizer means prior to entry into said canister, and the other path permitting the oxygen to bypass the vaporizer means initially and be mixed with the purged waste gases in the canister with the resulting gaseous mixture then being subject to said vaporizer means.

* * * * *